(12) United States Patent
Venkataraja et al.

(10) Patent No.: US 8,417,991 B2
(45) Date of Patent: Apr. 9, 2013

(54) MITIGATING REDUCTION IN AVAILABILITY LEVEL DURING MAINTENANCE OF NODES IN A CLUSTER

(75) Inventors: Hariprasad Nellitheertha Venkataraja, Bangalore (IN); Vijay Srinivas Agneeswaran, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 977 days.

(21) Appl. No.: 12/477,141

(22) Filed: Jun. 3, 2009

(65) Prior Publication Data
US 2010/0313063 A1    Dec. 9, 2010

(51) Int. Cl.
*G06F 11/00* (2006.01)
(52) U.S. Cl.
USPC ............................................ 714/12; 707/200
(58) Field of Classification Search .................. 717/168
See application file for complete search history.

(56) References Cited

U.S. PATENT DOCUMENTS

| | | | |
|---|---|---|---|
| 6,453,468 B1 | 9/2002 | D'Souza | |
| 6,976,079 B1 | 12/2005 | Ferguson et al. | |
| 7,743,372 B2 * | 6/2010 | Armstrong et al. | 717/168 |
| 2006/0130042 A1 | 6/2006 | Dias et al. | |
| 2006/0259594 A1 | 11/2006 | Paliwal et al. | |
| 2006/0294413 A1 | 12/2006 | Filz et al. | |
| 2008/0028396 A1 | 1/2008 | Stich et al. | |
| 2010/0162226 A1 * | 6/2010 | Borissov et al. | 717/173 |

OTHER PUBLICATIONS

"David E. Lowell, Yasushi Saito, and Eileen J. Samberg", "Devirtualizable Virtual Machines Enabling General, Single-Node, Online Maintenance", "ACM SIGPLAN Notices", Year of Publication: 2004, pp. 211-223, vol. 39, Issue 11 (Nov. 2004), ASPLOS '04 Oct. 9-13, Session: Reliability table of contents.

"Scheduling and Simulation: How to Upgrade Distributed Systems—Abstract", "http://portal.acm.org/citation.cfm?id=1251054.1251062&coll=Portal&dl=GUIDE&CFID=12755373&CFTOKEN=62940948", Downloaded Circa: Oct. 15, 2008, pp. 1-3.

"Sun Cluster", "http://blogs.sun.com/SC/entry/upgrade_methods", Downloaded Circa: Oct. 15, 2008, pp. 1-2.

"Using Maintenance Mode (Windows Only)", "http://www.co.multnomah.or.us/cfdocs/Using_ClusterCATS/admin5.html", Downloaded Circa: Oct. 15, 2008, pp. 1-2.

* cited by examiner

*Primary Examiner* — Don Wong
*Assistant Examiner* — Deric Ortiz
(74) *Attorney, Agent, or Firm* — Narendra Reddy Thappeta

(57) ABSTRACT

An aspect of the present invention mitigates reduction in availability level during maintenance of nodes in a cluster. In one embodiment, on receiving an indication that a maintenance activity is to be performed on the cluster, a scaling out of the cluster is first performed to add some nodes having the maintenance activity already performed, followed by a scaling in of the cluster to remove some of the nodes in the cluster which do not yet have the maintenance activity performed. The scaling out is performed before any scaling in of the cluster such that the number of nodes available in the cluster after the scaling in is not less than the number of nodes in the cluster at the time of receiving the indication. Accordingly, the reduction in availability level (which is based on the number of nodes available) is mitigated.

22 Claims, 4 Drawing Sheets

FIG. 3A

| | Server ID (321) | Software Installed (322) | Servicing Requests (323) |
|---|---|---|---|
| 351 → | 1001 | S1, S2, S3 | Yes |
| 352 → | 1002 | S1, S4 | Yes |
| 353 → | 1003 | S1, S2, S4, S5 | Yes |
| 354 → | 1407 | S1, S2, S3 | Yes |
| 355 → | 1408 | S1, S2, S4 | Yes |
| 356 → | 1409 | S1, S4, S5 | Yes |
| 357 → | 2001 | S1, S2, S4 | Yes |
| 358 → | 2002 | S1, S3, S5 | Yes |
| 359 → | 2003 | S1, S2 | No |
| 360 → | 2004 | S1, S2, S5 | No |

| | 1001 | 1003 | 1407 | 1408 | 2001 | 2003 | 2004 |
|---|---|---|---|---|---|---|---|
| t = 0 | x | x | x | x | x | - | - |
| t = 1 | x | x | x | x | x | o | o |
| t = 2 | - | x | x | x | x | o | o |
| t = 3 | o | x | x | x | - | o | o |
| t = 4 | o | - | x | x | o | o | o |
| t = 5 | o | o | - | x | o | o | o |
| t = 6 | o | o | o | - | o | o | o |
| t = 7 | o | o | o | o | o | o | o |
| t = 8 | o | o | o | o | o | - | - |

MITIGATING REDUCTION IN AVAILABILITY LEVEL DURING MAINTENANCE OF NODES IN A CLUSTER

BACKGROUND OF THE INVENTION

1. Technical Field

The present disclosure relates to cluster architectures/systems and more specifically to mitigating reduction in availability level during maintenance of nodes in a cluster.

2. Related Art

A cluster refers to a group of computers/digital processing systems (referred to as "nodes") typically connected by fast networks, and which work together to operate as a single computer/system in providing services. Clusters are often used to improve the performance of services by having multiple nodes provide the same service, commonly to provide fault-tolerance by having redundant nodes and to provide fast response times by load balancing when servicing a large number of users. Clusters are commonly used to perform computational intensive tasks such as weather simulations, (air/rail) traffic management, etc.

Availability level of a cluster is a measure of the quality of services that can be provided by the cluster, typically, in terms of one or more of the number of softwares (offering the services) that can be executed simultaneously, the number of instances of each software/services executed, the number of service/user requests that can be handled at the same time, etc. In general, the availability level of a cluster is determined by the number of nodes that are available/ready for processing the user requests (in addition to the hardware/software capability of each node). As such, a larger number of processing nodes in a cluster generally results in a high availability level, while a smaller number of processing nodes results in a low availability level.

There is a general need to perform maintenance related tasks on various nodes of a cluster, for example, to ensure that the most recent version of the softwares/services is being executed (and offered to the users). Maintenance implies that one or more of software or hardware components is being repaired/replaced/patched/added/deleted, etc., such that the corresponding node may be required to stop (or at least substantially reduce) processing user requests.

It may accordingly be appreciated that maintenance of nodes may cause reduction in the availability level (since the number of nodes available/ready for processing the user requests is reduced). It is generally desirable that the reduction in availability level during maintenance of nodes in a cluster be mitigated (lessened).

BRIEF DESCRIPTION OF THE DRAWINGS

Example embodiments of the present invention will be described with reference to the accompanying drawings briefly described below.

FIG. 3A depicts the manner in which information related to the nodes in a cluster is maintained in one embodiment.

FIG. 3B depicts a two-dimensional matrix illustrating the manner in which a software application installed in a cluster is upgraded (from an older/previous version 1.0 to a newer/upgraded version 2.0) in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention mitigates reduction in availability level during maintenance of nodes in a cluster. In one embodiment, on receiving an indication that a maintenance activity is to be performed on the cluster, a scaling out of the cluster is first performed to add some nodes having the maintenance activity already performed, followed by a scaling in of the cluster to remove some of the nodes in the cluster which do not yet have the maintenance activity performed. The scaling out is performed before any scaling in of the cluster such that the number of nodes available in the cluster after the scaling in is not less than the number of nodes in the cluster at the time of receiving the indication. Accordingly, the reduction in availability level (which is based on the number of nodes available) is mitigated.

In one scenario where each of the nodes in the cluster (as well as the added nodes) executes a same set of software applications, the scaling out and scaling in are repeatedly performed a number of times/iterations until all of the nodes in the cluster (on which the maintenance activity is yet to be performed) are replaced by corresponding nodes having the maintenance activity already performed.

Another aspect of the present invention facilitates maintenance when the nodes in the cluster do not execute the same set of software applications. In one embodiment, the scaling out and scaling in are repeatedly performed a number of times/iterations, with the maintenance activity being performed on the nodes removed in a previous iteration and then used as the set of nodes added in the scaling out of the cluster in the subsequent iteration following the previous iteration. Further, the set of nodes added during the scaling out of the cluster in the first iteration are removed after completion of the maintenance activity on all the original nodes in the cluster (at the time of receiving the indication).

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
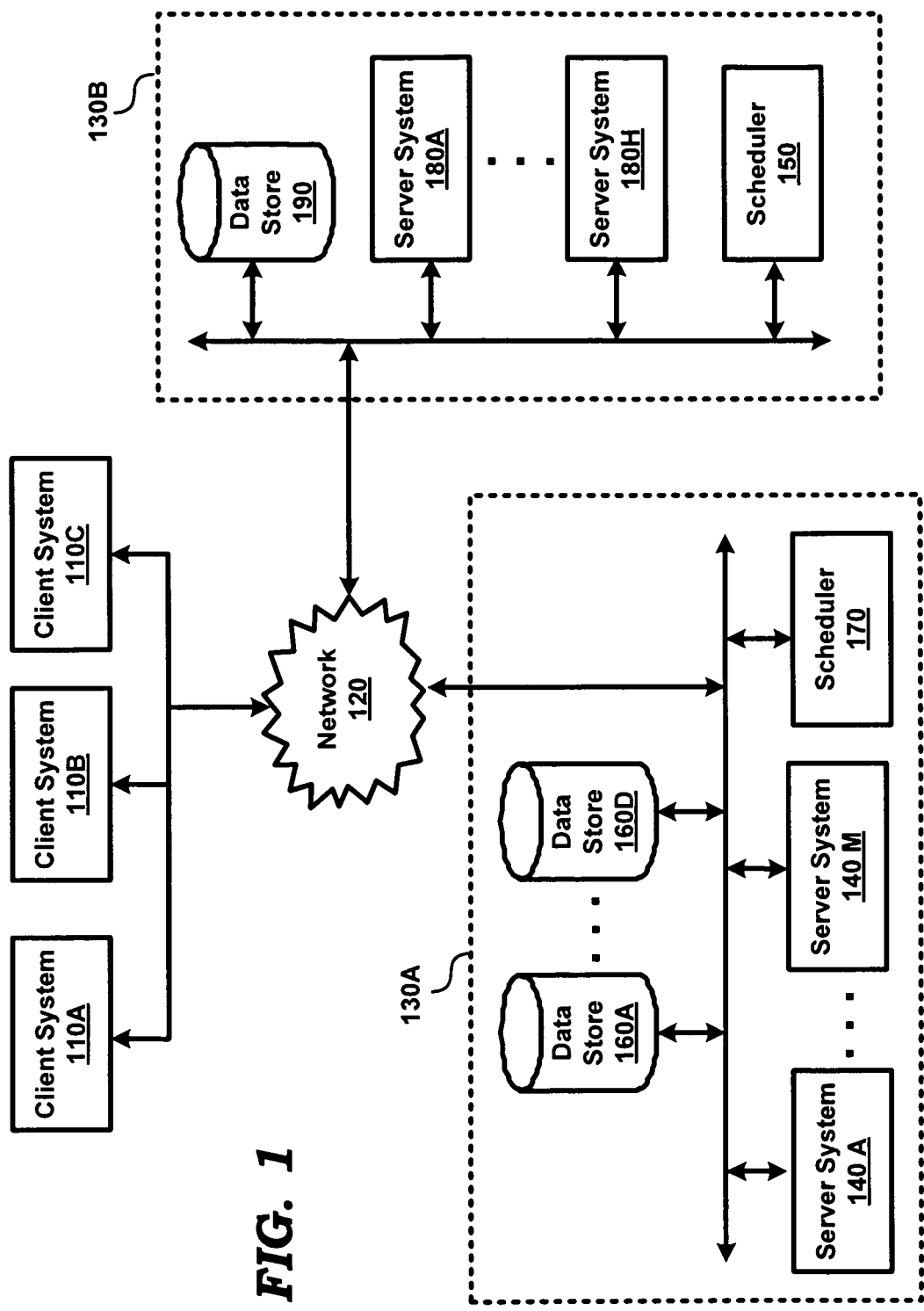
FIG. 1 is a block diagram illustrating an example environment (disaster recovery system) in which several aspects of the present invention can be implemented.

FIG. 1 is a block diagram illustrating an example environment (disaster recovery system) in which several aspects of the present invention can be implemented. As is well known, a disaster recovery system plays a crucial role in keeping a business organization running in the event of natural or manmade disasters such as earthquakes, floods or major accidents/attacks. A disaster recovery system typically involves maintenance of systems at two geographically different locations, hereafter referred to as the primary and secondary sites.

Accordingly, FIG. 1 is shown containing clusters 130A-130B along with client systems 110A-110C and network 120. Cluster 130A (shown containing server systems 140A-140M, data stores 160A-160D, and scheduler 170) represents the systems maintained at a primary site which are used during the normal operation of the business organization, while cluster 130B (shown containing server systems 180A-180H, data store 190, and scheduler 150) represents the systems maintained at a secondary site used during disaster situations.

It should be noted that the systems at the secondary site (cluster 130B) have to be similar to the systems operating at the primary site (cluster 130A) in terms of the type of hardware resources and/or softwares/services offered (though often at a smaller scale compared to the primary site). The systems at the secondary site are mostly unused during normal operation of the business organization (though some of the systems at the secondary site may be executing softwares for synchronization of data between the primary and the secondary sites). When a disaster is declared/determined to have occurred (such that cluster 130A is not available/accessible), the operations of the business organization are switched to the secondary site (cluster 130B) as quickly as possible to ensure continuous running of the business organization.

Merely for illustration, only representative number/type of systems/clusters is shown in the Figure. Many environments often contain many more clusters (both at the primary and secondary sites) containing many more systems, both in number and type, depending on the purpose for which the environment is designed. Each system/device of FIG. 1 is described below in further detail.

Network 120 provides connectivity between client systems 110A-110C and clusters 130A-130B. Network 120 may be implemented using protocols such as Transmission Control Protocol (TCP) and/or Internet Protocol (IP) well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

In one embodiment, network 120 is configured to forward packets having cluster 130A as the destination address to scheduler 170 of cluster 130A (before a disaster) and to scheduler 150 of cluster 130B (after the disaster is declared). Such configuration/effect can be implemented in a known way at different protocol levels, for example, having an underlying ATM transport network deliver packets to the desired site, by having both schedulers 150 and 170 configured to the same IP address and having the network 120 route the packets with that IP address to scheduler 170 in case of normal operation and to scheduler 150 in case of disaster, or using DNS (domain name server) aliasing (i.e., changing the mapping of the IP address corresponding to a same URL/name using which the client systems access the clusters).

Each of client systems 110A-110C represents a system such as a personal computer, workstation, mobile station, etc., used by users to generate (client) requests to enterprise applications/softwares executing in cluster 130A or 130B (primarily to cluster 130A during normal operation and to cluster 130B after a disaster is declared). The requests (for using specific services provided by the softwares) may be generated using appropriate user interfaces. In general, a client system requests an application/software for performing desired tasks/services and receives corresponding responses containing the results of performance/processing of the requested tasks/services.

Each of clusters 130A-130B represents a group of servers/systems (i.e., "nodes") such as server systems, data stores, schedulers, etc. that work together to operate as a single server/system. In other words, users using client systems 110A-110C view each of clusters 130A-130B as a single system offering specific services (without being concerned regarding the individual nodes in the cluster). Clusters may include heterogeneous (i.e., having different hardware/software configuration) collections of nodes, that may be distributed geographically across multiple locations, and may sometimes be administered by unrelated organizations (for example, when the secondary site is maintained by another business organization).

In one common implementation, the nodes in a cluster work in a tightly-coupled manner (wherein, data is shared among the nodes thereby requiring frequent communication among the nodes) for performing a single requested task/service. Accordingly, each cluster is designed to execute fewer tightly coupled computing intensive softwares/services.

Alternatively, each of the requested tasks/services may be performed using one or few nodes independently (without sharing data thereby requiring little or no inter-node communication). Such an architecture designed to execute a larger number of softwares/services, is commonly referred to as "Grid" computing (with the cluster being referred to as a "Grid"). In the present application, the term cluster is used to cover grids, as well.

Some of the typical (types of) nodes in a cluster, such as data stores, server systems, and scheduler as relevant to the understanding of the present invention are described in detail below. However, a cluster may contain more types and/or number (typically, in thousands) of nodes as will be apparent to one skilled in the relevant arts.

Each of data stores 160A-160D and 190 represents a non-volatile storage facilitating storage and retrieval of a collection of data by one or more enterprise applications/softwares executing in clusters 130A-130B, in particular in server systems 140A-140M and 180A-180H (typically while processing various client/user requests). Some of the data stores may be implemented using relational database technologies and therefore provide storage and retrieval of data using structured queries such as SQL (Structured Query Language). Other data stores may be implemented as file stores providing storage and retrieval of data in the form of one or more files organized as one or more directories, as is well known in the relevant arts.

Each of server systems 140A-140M and 180A-180H represents a server, such as a web/application server, capable of executing (same/different) software sets based on business requirements, the hardware configuration of the system, etc. A software set may include one or more instances of software programs such as operating system, device drivers, virtual machine software (such as JVM available from Sun Microsystems), enterprise applications designed to process requests received from client systems 110A-110C (based on data maintained internally or on external data, for example, maintained in data stores 160A-160D and 190), etc.

Each of scheduler 150 and 170 represents a server system which acts as a coordinator of the other systems in the cluster. Each scheduler typically executes management software programs such as load balancer, fail-over manager, etc., which co-ordinate/mediate the activities/execution of the multiple instances of the software programs, in particular, the enterprise applications in server systems 140A-140M and 180A-180H.

Each scheduler is designed as a point of access (in the cluster) for receiving user requests from client systems 110A-110C and forwarding the requests to the appropriate application/software instances. In this regard, each scheduler may maintain information indicating which of the nodes (and/or the application/software instances) are currently available/ready for processing user requests. Each scheduler may further facilitate adding, removing and/or upgrade of nodes (and/or the application/software instances) based on the volume of the user requests. Thus, each scheduler is responsible for keeping track of (and also maintaining) the availability level of the corresponding cluster.

It may be appreciated that though each of clusters 130A-130B is shown containing only a single scheduler, in alternative embodiments, each cluster may contain multiple schedulers which closely operate together to coordinate the activities/services of the other systems in the cluster and to maintain the availability level of the cluster.

It is often required that the maintenance of the software set (including enterprise applications) installed in cluster 130B be performed. For example, when the maintenance (upgrade/patch) of specific software sets (installed in systems 140A-140M) at the primary site is performed, the same maintenance actions may be required to be replicated/performed for the same software sets (installed in systems 180A-180H) at the secondary site to ensure that the "state" of the secondary site (cluster 130B) is similar to or in sync with that of the primary site (cluster 130A). Such synchronization enables the secondary site to start operations from where the primary site "left-off" (before disaster), thereby providing a continuous running of the business organization (at least from the point of view of the users using one of client system 110A-110C).

The maintenance of cluster 130B at the secondary site may entail that all (or at least some of) the nodes of the cluster, such as server systems b180A-180H, be shut down or made unavailable for processing user/service requests, thereby causing the availability level of cluster 130B to be reduced. Accordingly, in the event a disaster occurs during the maintenance of the secondary site, it may not be possible for the secondary site to take over the operations of the business organization from the primary site due to non-availability or reduced availability level of the secondary site.

Thus, it may be desirable that the time duration of reduced availability level of the secondary site during the maintenance of the nodes in cluster 130B be mitigated/lessened or even be completely removed (in other words, there is no reduction in the availability level). Scheduler 150, provided according to several aspects of the present invention, mitigates reduction in the availability level of the secondary site during the maintenance of the nodes in cluster 130B as described below with examples.

3. Mitigating Reduction in Availability Level During Maintenance

Figure 2:
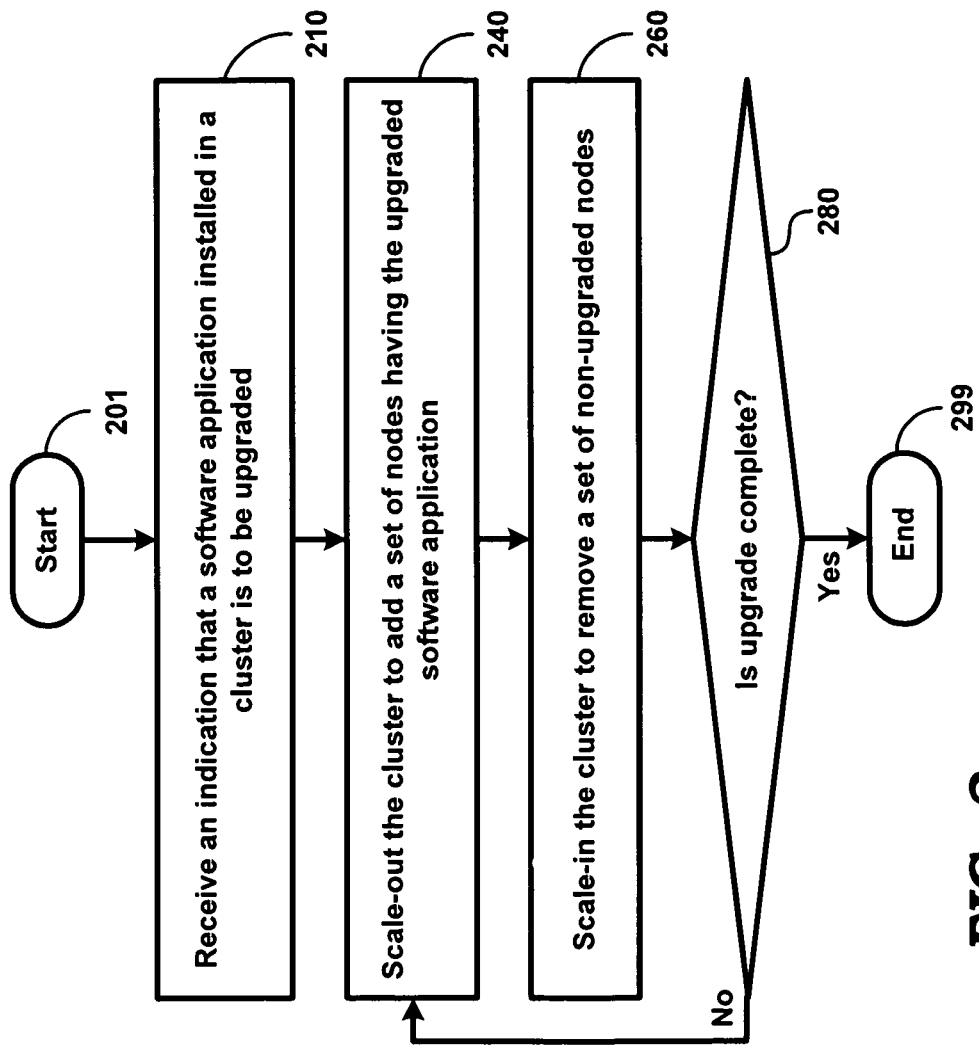
FIG. 2 is a flow chart illustrating the manner in which the reduction in availability level (of the secondary site) during maintenance of the nodes in a cluster is mitigated/lessened in an embodiment of the present invention.

FIG. 2 is a flow chart illustrating the manner in which the reduction in availability level (of the secondary site) during maintenance of the nodes in a cluster is mitigated/lessened in an embodiment of the present invention. The flowchart is described with respect to FIG. 1 merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, scheduler 150 receives an indication that a software/enterprise application installed in a cluster (130B) is to be upgraded (an example of a maintenance activity). The indication may be received (e.g., from scheduler 170) after the maintenance of the same application has been performed in the primary site (cluster 130A). The indication may also be received as part of a regular maintenance cycle performed for the systems at the secondary site.

The indication may specify the name/identifier of the enterprise application as well as the specific maintenance activity (upgrade) to be performed. For example, the indication may specify that an older/previous version (1.0) of the software application needs to be replaced by a newer/upgraded version (2.0). It is noted that the term "upgrade" refers to the change in the software code/data constituting the software application, and accordingly may refer to any one of installation of new softwares, upgrade of the existing softwares/services from an older version to a newer version, patching of the existing softwares to fix errors/improve performance, etc. Other maintenance activities (e.g. repair of the hardware resources) may also be performed instead of the upgrade of the software application.

It may be appreciated that on receiving the indication, scheduler 150 may first identify the nodes that form the cluster (130B), that is the specific server systems, data stores, etc. that are being used for processing user/service requests. In one embodiment described below, the identification of the nodes forming the cluster is performed based on the node information maintained by scheduler 150.

In step 240, scheduler 150 scales-out the cluster (130B) to add a set of nodes installed with the upgraded software application. Scale-out refers to the process of adding nodes to a cluster such that future user/service requests can be processed using the newly added nodes. Scale-out increases the availability level of the cluster (in particular, with respect to the software application sought to be upgraded), since the number of nodes available/ready for processing are increased.

Thus, scheduler 150 by scaling-out cluster 130B adds a set of nodes (not shown in FIG. 1) having the upgraded software application. Scheduler 150 may then forward user requests (for processing) to the newly added set of upgraded nodes as well as the non-upgraded nodes (server systems 180A-180H) in cluster 130B.

Before performing the scale-out, scheduler 150 may be required to identify a specific set of nodes to be upgraded and to perform the upgrade of the software application on the identified set of nodes (to facilitate scale-out). In one embodiment described below, scheduler 150 identifies "free" nodes that are not processing requests and do not form part of any cluster. However, in alternative embodiment, even nodes forming part of cluster 130B, but not executing the software application sought to be upgraded, can be used as the set of nodes to be upgraded and added.

It may be appreciated that the processing of the user requests by the upgraded nodes should be implemented "similar" to the processing performed by the non-upgraded nodes, such that the users viewing the responses to the requests are unable to distinguish between the different versions of the software application. Alternatively, the users may be made aware of the differences in the different versions by way of notices/messages posted to the user interface, in particular, when the processing of the user requests by different versions causes different types/forms of user interfaces to be displayed to the user.

In step 260, scheduler 150 scales-in the cluster to remove a set of non-upgraded nodes. Scale-in refers to the process of removing nodes from a cluster such that the removed nodes are not available for processing future user/service requests. Scale-in generally decreases the availability level of the cluster, since the number of nodes available/ready for processing are decreased.

Thus, scheduler 150 scales-in cluster 130B such that a set of non-upgraded nodes (not executing the upgraded software application) is removed from the cluster. Scheduler 150 may then forward user requests (for processing) to the combination of upgraded and non-upgraded nodes in cluster 130B.

Before performing the scale-in, scheduler 150 may first identify the specific set of non-Non-Provisional upgraded nodes to be removed. Scheduler 150 may then stop forwarding user requests to the identified nodes and wait for each identified node to complete processing of the already forwarded user/service requests. Scheduler 150 performs the scale-in only after determining that all the identified nodes are ready (that is, have completed processing of all pending user/service requests) to be removed.

It may be appreciated that the number of non-upgraded nodes removed by scale-in of the cluster in step 260 can be different from (not equal to) the number of upgraded nodes added by the scale-out of the cluster in step 240. Any convenient number of nodes can be chosen for the scale-out and scale-in of the clusters. However, it is generally preferable that the number of non-upgraded nodes removed be less than or equal to the number of upgraded nodes added, since removing more number of nodes (larger than the added number of nodes) can cause reduction in availability level.

Further, the number of nodes added/removed may be based on the total number of nodes in the cluster. Though it may be possible to choose the number of nodes to be added/removed to be equal to the total number of nodes in the cluster to facilitate maintenance of the cluster by a single scale-out and a single scale-in, such an approach is impractical in several environments since the total number of nodes is of the order of thousands. Accordingly, a practically implementable number (e.g. between 10 and 100 or 5-20% of the total number of nodes in the cluster) of nodes needs to be chosen for performing the maintenance.

In step 280, scheduler 150 checks whether the upgrade of (all the nodes executing the) software application in the cluster (130B) is complete. The checking may be performed in any convenient manner. In one embodiment, respective counters are maintained indicating the number of nodes in the cluster (executing the software application) when the indication of step 210 is received and the number of nodes that have been upgraded. When the values in the two counters are equal, the upgrade may be deemed to be completed. Control passes to step 240 if there are additional nodes to be upgraded and to step 299 otherwise. The flowchart ends in step 299.

It should be appreciated that the scale out of step 240 is performed before the scale-in of step 260, thereby mitigating the reduction of availability level of the cluster (e.g., 130B at the secondary site) during maintenance. Accordingly, the time duration during which the secondary site in not able to take over from the primary site in the event of a disaster may be reduced.

It may be also appreciated that multiple iterations of steps 240, 260 and 280 may be required to be performed for the upgrade of (all the nodes executing the) software application in the cluster (130B). During each of the iterations, a set of upgraded nodes are added to the cluster and the same number of the non-upgraded nodes may be removed from the cluster. Accordingly, the number of nodes servicing/processing user requests can be maintained no lesser than a desired level (e.g., equaling the same number of nodes as when the indication of step 210 is received), thereby ensuring that the availability level of the cluster is not reduced.

In an embodiment implemented according to FIG. 2, the flowchart operates to remove all the nodes with the older version of the software application and replaces them with new nodes executing the upgraded version of the software application. Such an approach may be adequate in situations when all the nodes in the cluster and the newly added nodes, are executing the same software set such that any two nodes are interchangeable.

However, there may be scenarios where the software set executing on different nodes may not be the same, and it may be accordingly desirable to ensure that the upgraded version of the software application be provided on the same set of nodes (as at step 210). An aspect of the present invention provides such a feature, as described below with an example.

4. Illustrative Example

FIGS. 3A and 3B together illustrate the manner in which reduction in availability level (of the secondary site) during maintenance of the nodes in a cluster (130B) is mitigated/lessened in one embodiment. The description is continued assuming that the maintenance is required to be performed on nodes executing different software sets. Each of the Figures is described in detail below.

Broadly, an initial set of free nodes (not present in cluster 130B) is added during the first iteration of step 240. For subsequent iterations, the non-upgraded nodes (one of server systems 180A-180H) removed from the cluster after the previous iteration of the scale in of step 260 are upgraded and used as the set of nodes that are added during the scale out of step 240. The iterations are performed until all the nodes first set of nodes with said maintenance activity performed. The initial set of free nodes is then removed (by performing a scale in) from the cluster. Accordingly, the upgraded version of the software application is provided on the same set of nodes forming the cluster (as identified at step 210).

FIG. 3A depicts the manner in which information related to the nodes in cluster 130B is maintained (by scheduler 150) in one embodiment. The node information is shown in a tabular format merely for convenience. However, in alternative embodiments, the node information may be maintained using any convenient data structure such as linked lists, stacks, queues, etc. as will be apparent to one skilled in the relevant arts by reading the disclosure herein.

Table 300 specifies the application/software instances executing in nodes (in a cluster such as 130B). Column 321 (labeled "Server ID") specifies a unique name/identifier of each node, column 322 (labeled "Software Installed") specifies the softwares installed in each of the nodes and column 323 (labeled "Servicing Requests") specifies whether the corresponding node is ready/available for processing (value "Yes") the user requests or not (value "No").

Only representative identifiers of the softwares (for example, "S1", "S2", etc) are specified in column 322, with the identifiers representing softwares such as Linux operating system available from Red Hat Corporation, Oracle database, EBSO application, Peoplesoft Application, Hyperion Software all available from Oracle Corporation (intended assignee of the subject patent application), etc. In general, the identifiers "S1", "S2", etc. may identify any desired softwares (or portions of softwares) according to the requirements of the environment in which the features of the invention is sought to be implemented.

Further, it is assumed that the value "Yes" for column 323 indicates that the node is ready to process requests directed to all the softwares executing in the node, as indicated by the corresponding value in column 322. However, in alternative embodiments, column 323 may be modified to indicate the availability for each of the softwares executing in the node, for example, in the form of a string "YYY", with each "Y" indicating that the corresponding software is available (with a "N" indicating non-availability).

Each of rows 351-360 indicates the details of a corresponding node (either in the cluster or a free node). For example, row 351 indicates that the corresponding node uniquely identified by the value "1001" (column 321) is executing the softwares S1, S2 and S3 (column 322) which are available/ready for processing user requests (column 323). It may be appreciated that the nodes 1001, 1002, 1003, 1407, 1408, 1409, 2001 and 2002 in rows 351-358 may correspond to server systems 180A-180H of cluster 130B, while the nodes 2003 and 2004 in rows 359-360 may be free nodes that do not form part of cluster 130B at the time instance the indication of step 210 is received (and accordingly may be used for the scale-out of cluster 130B).

Thus, scheduler 150 maintains information related to software/application instances executing on different nodes and also whether the nodes are available/ready for processing user requests. The maintained information may be used by scheduler 150 for performing the upgrade of software in the cluster. The manner in which software application S2 installed in cluster 130B is upgraded in one embodiment is described in detail below.

FIG. 3B depicts a two-dimensional matrix illustrating the manner in which a software application (S2) installed in a cluster (130B) is upgraded (from an older/previous version 1.0 to a newer/upgraded version 2.0) in one embodiment.

Matrix 380 is shown containing columns corresponding to the nodes 1001, 1003, 1407, 1408 and 2001 in the cluster that have software S2 already installed with the older version (as indicated by the value of the column 322 in rows 351 and 353-357 of table 300) and the free nodes 2003 and 2004 (rows 359-360). Matrix 380 is also shown containing rows corresponding to several time instances (t=0, t=1, t=2, etc., with each time instance representing a unit time period) during the performance of the upgrade of the software application S2 in cluster 130B.

The intersection of each row and column in matrix 380 indicates the state of the corresponding nodes at the corresponding time instance. The state is indicated as "X" if the corresponding node is executing (and processing user requests by) the older version (1.0) of the software application S2 and as "O" if the corresponding node is executing the newer/upgraded version (2.0) of the software application. In other words, "X" indicates that the corresponding node does not yet have the maintenance activity performed while "O" indicates that the node has the maintenance activity (already) performed. The state "-" indicates that the corresponding node is not part of the cluster and accordingly is not servicing/processing user requests (a free node).

The row "t=0" corresponds to the initial state (before upgrade) of cluster 130B. In response to receiving an indication that software application S2 is to be upgraded from version 1.0 to version 2.0 (step 210), scheduler 150 first identifies the nodes forming the cluster as well as the specific set of nodes that are executing version 1.0 of the software application S2. Scheduler 150 also maintains a remaining counter indicating the number of nodes that are yet to be upgraded and accordingly sets the remaining counter to the value 5 (indicating 5 nodes). Scheduler 150 then determines the free nodes (e.g. 2003 and 2004) that can be used for scaling-out cluster 130B based on the node information maintained in table 300 and performs the upgrade of the software application on the free nodes.

After upgrade of the free nodes is complete, scheduler 150 scales-out cluster 130B to add the two nodes 2003 and 2004 having the upgraded software S2 (step 240) as shown by the row "t=1". Scheduler 150 then scales-in cluster 130B to remove the two non-upgraded nodes assumed to be 1001 and 2001 from cluster 130B as shown by the row "t=2". The identification of the specific nodes to be removed may be identified based on whether the nodes are processing user requests (by the software S2 sought to be upgraded), whether instances of the other softwares are sufficient for processing the user requests, the load balancing performed on the different software instances, etc.

It is assumed that that the number of non-upgraded nodes removed during scale-in of cluster 130B is equal to or less than the number of upgraded nodes added during scale-out of cluster 130B. Accordingly, after each iteration of the scale out and scale in (steps 240 and 260), scheduler 150 reduces the remaining counter by the number of nodes the cluster that have been upgraded. Accordingly, at "t=2", the remaining counter is set to the value 5 (the current value−the number of nodes in the cluster have been upgraded=5−0).

It may be observed that the row "t=2" indicates that nodes 1003, 1407 and 1408 are executing version 1.0 of the software S2, while nodes 2003 and 2004 are executing version 2.0 of the software S2. Scheduler 150 then determines that the software upgrade is not complete (since the value of remaining counter is not zero) and performs the next iteration of the steps 240, 260 and 280. As described above, scheduler 150 performs the upgrade of the non-upgraded removed during scale-in (e.g., nodes 1001 and 2001) and uses the newly upgraded nodes for performing the scale-out of cluster 130B during the subsequent iteration.

The row "t=3" corresponds to the state of the nodes after the scale-out of the cluster has been performed during the second iteration to add the previously removed two nodes 1001 and 2001 (which have been upgraded) to cluster 130B. The row "t=4" corresponds to the state of the nodes after the scale-in has been performed during the second iteration to remove two non-upgraded nodes assumed to be 1003 and 1408 (as indicated by "-") from cluster 130B. Accordingly, at "t=4", there are four nodes executing version 2.0 while there is a single node 1407 executing version 1.0. The remaining counter is set to the value 3 (the current value−the number of nodes in the cluster have been upgraded=5−2) indicating that a third iteration is required to be performed.

The row "t=5" corresponds to the state of the nodes after the scale-out of the cluster has been performed during the third iteration to add the previously removed two nodes 1003 and 1408 (which have been upgraded) to cluster 130B. The row "t=6" corresponds to the state of the nodes after the scale-in has been performed during the third iteration to remove the one remaining non-upgraded node 1407 (as indicated by "-") from cluster 130B. Accordingly, at "t=6", there are six nodes executing version 2.0 while there no nodes executing version 1.0. The remaining counter is set to the value 1 (the current value–the number of nodes in the cluster have been upgraded=3−2) indicating that a fourth iteration is required to be performed.

The row "t=7" corresponds to the state of the nodes after the scale-out of the cluster has been performed during the fourth iteration to add the previously removed node 1407 (which has been upgraded) to cluster 130B. It may be observed that at "t=7", all the seven nodes are executing version 2.0, and as such the scale-in performed during the fourth iteration does not remove any nodes. The remaining counter is set to the value 0 (the current value–the number of nodes in the cluster have been upgraded=1−1), indicating that the upgrade is complete (at step 280). The row "t=8" corresponds to the final state of the nodes after the upgrade is complete and the initial set of free nodes 2003 and 2004 have been removed from the cluster (by an additional scale-in performed as step 290, not shown in FIG. 2).

It may be observed that in the initial state at "t=0", there are five nodes executing version 1.0 of the software "S2", while in the final state at "t=8" there are the same five nodes executing 2.0 of the software "S2". Further, at each intermediate state (t=1, t=2 and t=3), there is at least five nodes (a combination of version 1.0 and 2.0) that are ready/available for processing the user requests. Accordingly, the reduction in availability level during maintenance of the nodes in a cluster is mitigated. Due to the availability level at each time instance, the cluster 130B at the secondary site is ready to take over the operation of the cluster 130A at the primary site in the event of a disaster.

It may be appreciated that several features of the present invention are described above as being implemented in the context of maintenance of a cluster in a secondary site. However, the features of the invention can be implemented for maintenance of the clusters (e.g. 130A) in the primary site as well or for maintenance of clusters in other environments (non disaster recovery systems) as will be apparent to one skilled in the relevant arts by reading the disclosure provided herein.

It should be further appreciated that the features described above can be implemented in various embodiments as a desired combination of one or more of hardware, software, and firmware. The description is continued with respect to an embodiment in which various features are operative when the software instructions described above are executed.

5. Digital Processing System

Figure 4:
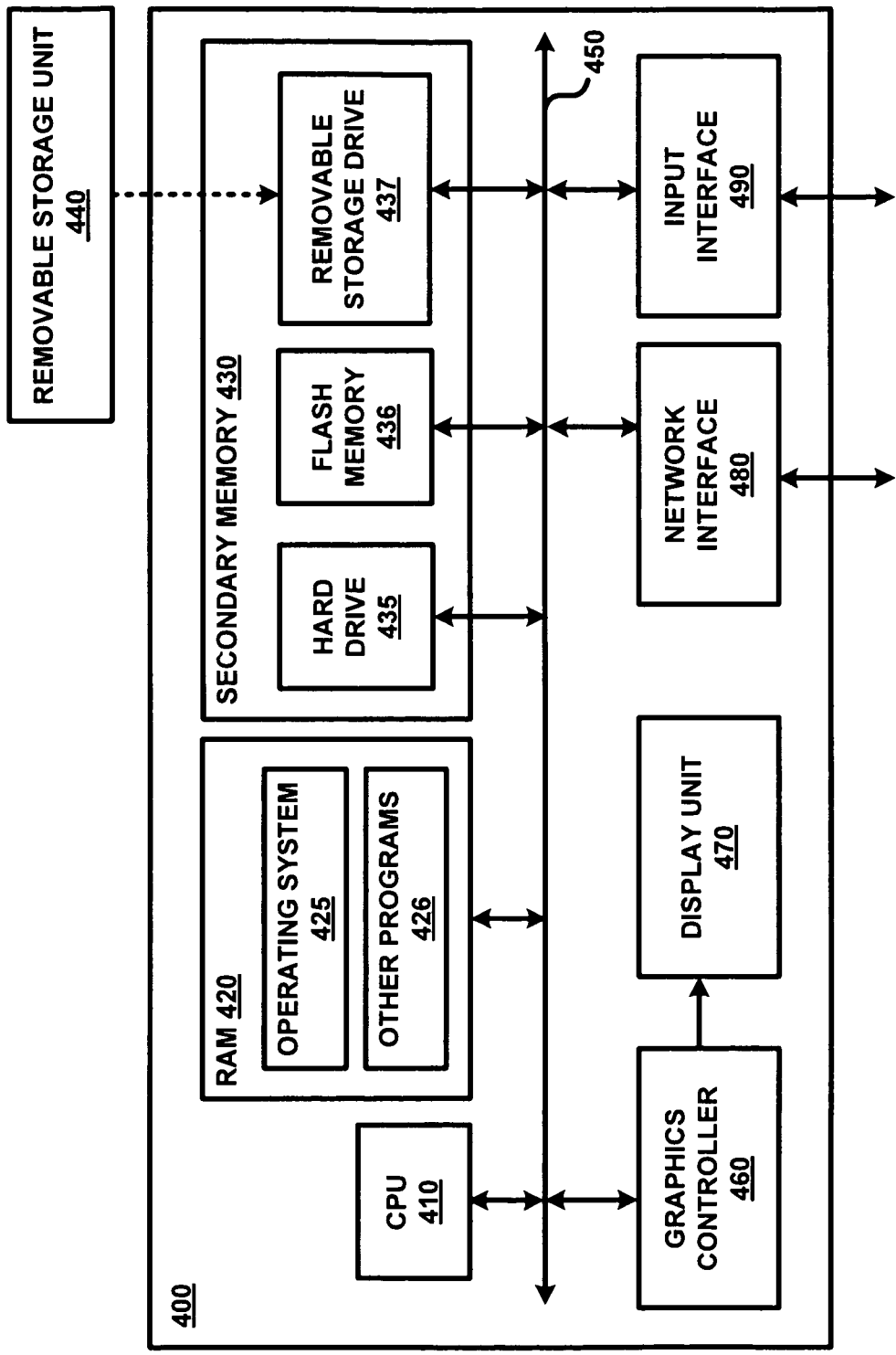
FIG. 4 is a block diagram illustrating the details of a digital processing system in which various aspects of the present invention are operative by execution of appropriate software instructions.

FIG. 4 is a block diagram illustrating the details of digital processing system 400 in which various aspects of the present invention are operative by execution of appropriate software instructions. Digital processing system 400 may correspond to scheduler 150 (or any one of server systems 180A-180H which manages the activities of the other systems in cluster 130B).

Digital processing system 400 may contain one or more processors such as a central processing unit (CPU) 410, random access memory (RAM) 420, secondary memory 430, graphics controller 460, display unit 470, network interface 480, and input interface 490. All the components except display unit 470 may communicate with each other over communication path 450, which may contain several buses as is well known in the relevant arts. The components of FIG. 4 are described below in further detail.

CPU 410 may execute instructions stored in RAM 420 to provide several features of the present invention. CPU 410 may contain multiple processing units, with each processing unit potentially being designed for a specific task. Alternatively, CPU 410 may contain only a single general-purpose processing unit.

RAM 420 may receive instructions from secondary memory 430 using communication path 450. RAM 420 is shown currently containing software instructions constituting operating system 425 and/or other code/programs 426 (such as client applications, Web browser, application instances processing user requests, load balancer/management applications, RDBMS, etc.). In addition to operating system 425, RAM 420 may contain other software programs such as device drivers, virtual machines, etc., which provide a (common) run time environment for execution of other code/programs.

Graphics controller 460 generates display signals (e.g., in RGB format) to display unit 470 based on data/instructions received from CPU 410. Display unit 470 contains a display screen to display the images defined by the display signals. Input interface 490 may correspond to a keyboard and a pointing device (e.g., touch-pad, mouse) and may be used to provide inputs. Network interface 480 provides connectivity to a network (e.g., using Internet Protocol), and may be used to communicate with other systems connected to the network.

Secondary memory 430 may contain hard drive 436, flash memory 437, and removable storage drive 438. Secondary memory 430 may store the data (for example, in the form of one or more files organized as a file system) and software instructions, which enable digital processing system 400 to provide several features in accordance with the present invention.

Some or all of the data and instructions may be provided on removable storage unit 439, and the data and instructions may be read and provided by removable storage drive 438 to CPU 410. Floppy drive, magnetic tape drive, CD-ROM drive, DVD Drive, Flash memory, removable memory chip (PCMCIA Card, EPROM) are examples of such removable storage drive 438.

Removable storage unit 439 may be implemented using medium and storage format compatible with removable storage drive 438 such that removable storage drive 438 can read the data and instructions. Thus, removable storage unit 439 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 439 or hard disk installed in hard drive 436. These computer program products are means for providing software to digital processing system 400. CPU 410 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of performing maintenance of nodes in a cluster, said method comprising:
   receiving an indication that a maintenance activity is to be performed on said cluster, wherein said cluster is formed of a first set of nodes when said indication is received;
   scaling out said cluster to add a second set of nodes having said maintenance activity already performed; and
   scaling in said cluster to remove a subset of said first set of nodes which do not yet have said maintenance activity performed,
   wherein said scaling out is performed in response to said receiving of said indication, and said scaling in is performed after said scaling out,
   wherein each of said first set of nodes and said second set of nodes is a corresponding server system.

2. The method of claim 1, wherein said scaling out is performed before any scaling in of said cluster after receiving said indication, such that the number of nodes available in said cluster after said scaling in is not less than the number of nodes in said cluster at the time of receiving said indication.

3. The method of claim 2, wherein said maintenance activity comprises upgrading a software application executing on each of said first set of nodes from a previous version to a newer version.

4. The method of claim 2, wherein each of said first set of nodes and said second set of nodes executes a same set of software applications,
   wherein said scaling out and said scaling in are performed a plurality of iterations until all of said first set of nodes are replaced by corresponding nodes having said maintenance activity already performed.

5. The method of claim 2, wherein said scaling out and said scaling in are performed in a plurality of iterations, said method further comprising:
   performing said maintenance activity on said subset of said first set of nodes after said scaling in of said cluster in a first iteration of said plurality of iterations,
   wherein said subset of said first set of nodes, with said maintenance activity performed, is added to said cluster in a subsequent iteration following said first iteration,
   wherein said first iteration and said subsequent iteration are contained in said plurality of iterations.

6. The method of claim 5, further comprising removing said second set of nodes of said first iteration from said cluster after completion of maintenance activity on all of said first set of nodes.

7. The method of claim 6, wherein all of said first set of nodes do not execute a same set of applications, and
   wherein said plurality of iterations operate to provide said first set of nodes, with said maintenance activity performed, to said cluster.

8. A cluster comprising:
   a first set of nodes, each implemented as a corresponding server system containing at least one processor and at least one memory unit; and
   a scheduler system operable to:
      receive an indication that a maintenance activity is to be performed on said cluster;
      scale out said cluster to add a second set of nodes having said maintenance activity already performed; and
      scale in said cluster to remove a subset of said first set of nodes which do not yet have said maintenance activity performed,
      wherein said scaling out is performed in response to said receiving of said indication, and said scaling in is performed after said scaling out
      wherein each of said first set of nodes and said second set of nodes is a corresponding server system.

9. The cluster of claim 8, wherein said scheduler system performs said scaling out before any scaling in of said cluster after receiving said indication, such that the number of nodes available in said cluster after said scaling in is not less than the number of nodes in said cluster at the time of receiving said indication.

10. The cluster of claim 9, wherein said maintenance activity comprises upgrading a software application executing on each of said first set of nodes from a previous version to a newer version.

11. The cluster of claim 9, wherein each of said first set of nodes and said second set of nodes executes a same set of software applications,
    wherein said scheduler system performs said scaling out and said scaling in a plurality of iterations until all of said first set of nodes are replaced by corresponding nodes having said maintenance activity already performed.

12. The cluster of claim 9, wherein said scheduler system performs said scaling out and said scaling in a plurality of iterations, wherein said scheduler system is further operable to:
    perform said maintenance activity on said subset of said first set of nodes after said scaling in of said cluster in a first iteration of said plurality of iterations,
    wherein said scheduler system adds said subset of said first set of nodes, with said maintenance activity performed, to said cluster in a subsequent iteration following said first iteration,
    wherein said first iteration and said subsequent iteration are contained in said plurality of iterations.

13. The cluster of claim 12, said scheduler system further operable to remove said second set of nodes of said first iteration from said cluster after completion of maintenance activity on all of said first set of nodes.

14. The cluster of claim 13, wherein all of said first set of nodes do not execute a same set of applications, and where said plurality of iterations operate to provide said first set of nodes, with said maintenance activity performed, to said cluster.

15. A machine readable medium storing one or more sequences of instructions for causing a system to perform maintenance of nodes in a cluster, wherein execution of said one or more sequences of instructions by one or more processors contained in said system causes said system to perform the actions of:

receiving an indication that a maintenance activity is to be performed on said cluster, wherein said cluster is formed of a first set of nodes when said indication is received;

scaling out said cluster to add a second set of nodes having said maintenance activity already performed; and scaling in said cluster to remove a subset of said first set of nodes which do not yet have said maintenance activity performed, wherein said scaling out is performed in response to said receiving of said indication, and said scaling in is performed after said scaling out, wherein each of said first set of nodes and said second set of nodes is a corresponding server system.

16. The machine readable medium of claim 15, wherein said scaling out is performed before any scaling in of said cluster after receiving said indication, such that the number of nodes available in said cluster after said scaling in is not less than the number of nodes in said cluster at the time of receiving said indication.

17. The machine readable medium of claim 16, wherein each of said first set of nodes and said second set of nodes executes a same set of software applications, wherein said scaling out and said scaling in are performed a plurality of iterations until all of said first set of nodes are replaced by corresponding nodes having said maintenance activity already performed.

18. The machine readable medium of claim 16, wherein said scaling out and said scaling in are performed in a plurality of iterations, further comprising one or more instructions for:

performing said maintenance activity on said subset of said first set of nodes after said scaling in of said cluster in a first iteration of said plurality of iterations, wherein said subset of said first set of nodes, with said maintenance activity performed, is added to said cluster in a subsequent iteration following said first iteration, wherein said first iteration and said subsequent iteration are contained in said plurality of iterations.

19. The machine readable medium of claim 18, further comprising one or more instructions for removing said second set of nodes of said first iteration from said cluster after completion of maintenance activity on all of said first set of nodes.

20. The machine readable medium of claim 19, wherein all of said first set of nodes do not execute a same set of applications, and wherein said plurality of iterations operate to provide said first set of nodes, with said maintenance activity performed, to said cluster.

21. The method of claim 1, wherein each server system of said second set of nodes processes requests with additional set of processing and memory resources upon being included in said cluster by said scaling out, and wherein each server system of said first set of nodes is available to process requests with same set of processing and memory resources in an entire duration the server system is part of said cluster before being removed from said cluster by said scaling in.

22. The cluster of claim 8, wherein said indication is received at a first time point, said scaling out is performed at a second time point and said scale in is performed at a third time point, wherein said second time point follows said first time point, and said third time point follows said second time point, wherein each server system of said first set of nodes is available to process requests with same set of processing and memory resources in both of a first duration and a second duration, wherein said first duration is the time interval between said first time point and second time point, and said second duration is the time interval between said second time point and said third time point.

\* \* \* \* \*

UNITED STATES PATENT AND TRADEMARK OFFICE
CERTIFICATE OF CORRECTION

PATENT NO. : 8,417,991 B2
APPLICATION NO. : 12/477141
DATED : April 9, 2013
INVENTOR(S) : Venkataraja et al.

It is certified that error appears in the above-identified patent and that said Letters Patent is hereby corrected as shown below:

In the Specifications:

In column 7, line 21, delete "non-Non-Provisional upgraded" and insert -- non-upgraded --, therefor.

In column 10, line 25, after "assumed that" delete "that".

In the Claims:

In column 14, line 26, in Claim 8, delete "out" and insert -- out, --, therefor.

In column 14, line 59, in Claim 13, after "claim 12," insert -- wherein --.

Signed and Sealed this
Thirtieth Day of July, 2013

Teresa Stanek Rea
*Acting Director of the United States Patent and Trademark Office*